United States Patent [19]
Kinlen et al.

[11] Patent Number: 6,015,613
[45] Date of Patent: Jan. 18, 2000

[54] CORROSION INHIBITING MULTILAYER COATING

[76] Inventors: Patrick John Kinlen, 1348 Remington Oaks Ter., Fenton, Mo. 63026; David Charles Silverman, 14314 Strawbridge Ct., Chesterfield, Mo. 63017; Christopher John Hardiman, 20 Garden St., Farmington, Conn. 06032

[21] Appl. No.: 08/591,439
[22] PCT Filed: Jul. 22, 1994
[86] PCT No.: PCT/US94/08259
   § 371 Date: Mar. 11, 1996
   § 102(e) Date: Mar. 11, 1996
[87] PCT Pub. No.: WO95/03136
   PCT Pub. Date: Feb. 2, 1995

Related U.S. Application Data

[63] Continuation-in-part of application No. 08/096,661, Jul. 23, 1993, Pat. No. 5,532,025.

[51] Int. Cl.$^7$ ............................. B32B 15/04; B32B 15/08; B05D 5/00
[52] U.S. Cl. ............................ 428/332; 428/457; 428/461; 428/469; 427/256; 427/409
[58] Field of Search .......................... 427/383.1, 384, 427/388.1, 287, 256, 409; 204/471; 428/457, 461, 215, 332, 462, 469

[56] References Cited

U.S. PATENT DOCUMENTS

| | | | |
|---|---|---|---|
| 3,419,537 | 12/1968 | Rembaum et al. | 260/85.5 |
| 3,849,141 | 11/1974 | Palm et al. | 106/1 |
| 4,559,112 | 12/1985 | Tamamura | 204/12 |
| 4,581,395 | 4/1986 | Nakaya et al. | 523/410 |
| 4,678,601 | 7/1987 | Ham et al. | 252/500 |
| 4,690,962 | 9/1987 | Clark et al. | 524/94 |
| 4,728,399 | 3/1988 | Moehwald | 204/38.3 |
| 4,818,777 | 4/1989 | Braig | 524/83 |
| 4,851,487 | 7/1989 | Yaniger et al. | 525/540 |
| 4,910,072 | 3/1990 | Morgan et al. | 428/212 |
| 4,927,897 | 5/1990 | Kawata et al. | 526/240 |
| 4,960,761 | 10/1990 | Yodice | 502/159 |
| 4,983,690 | 1/1991 | Cameron et al. | 525/436 |
| 5,021,489 | 6/1991 | Knight et al. | 524/140 |
| 5,069,820 | 12/1991 | Jen et al. | 252/500 |
| 5,093,033 | 3/1992 | Feldhues et al. | 252/500 |
| 5,098,938 | 3/1992 | Savin | 523/220 |
| 5,109,070 | 4/1992 | Epstein et al. | 525/189 |
| 5,120,472 | 6/1992 | Shikatani et al. | 252/500 |
| 5,134,177 | 7/1992 | Aklonis et al. | 523/201 |
| 5,137,991 | 8/1992 | Epstein et al. | 525/540 |
| 5,139,703 | 8/1992 | Jen et al. | 252/500 |
| 5,147,913 | 9/1992 | MacDiarmid et al. | 524/104 |
| 5,152,929 | 10/1992 | Bentley et al. | 252/391 |
| 5,158,707 | 10/1992 | Vestberg et al. | 252/500 |
| 5,160,457 | 11/1992 | Elsenbaumer | 252/500 |
| 5,164,465 | 11/1992 | Epstein et al. | 525/540 |

(List continued on next page.)

FOREIGN PATENT DOCUMENTS

| | | |
|---|---|---|
| 2088826 | 8/1993 | Canada. |
| 0217081 | 4/1987 | European Pat. Off.. |
| 0497514 | 8/1992 | European Pat. Off.. |
| 2203861 | 10/1973 | France. |
| 2679240 | 7/1991 | France. |
| WO 89/02155 | 3/1989 | WIPO. |
| WO 92/20072 | 11/1992 | WIPO. |
| WO 93/14166 | 7/1993 | WIPO. |

OTHER PUBLICATIONS

V.G. Kulkarni, et al., Processable Intrinsically Conducting Polymer Blends; *Journal of Vinyl Technology*; Jun. 1992, vol. 14., No. 2, pp. 123–124.

Karen G. Thompson, et al., Corrosion–Protective Coatings from Electrically Conducting Polymers; Los Alamos Technology Laboratory, 1991 (No Month).

David W. DeBerry et al., Properties of Active/Passive Metals Modified by Electroactive Coatings; Fundamental Aspects of Corrosion Protection by Surface Modification, 1984, vol. 84–3, pp. 308–323 (No Month).

David W. DeBerry, Modification of the Electrochemical and Corrosion Behavior of Stainless Steels with an Electroactive Coating, *J. Electrochem. Soc.: Electrochemical Science and Technology*, May 1985, pp. 1022–1026.

S. Ren et al., Electrochemically Prepared Poly(3–methylthiophene) Films for Passivation of 430 Stainless Steel, *J. Electrochem. Soc.*, Apr. 4, 1992, vol. 139, pp. 1021–1026.

Troch–Nagels, et al., Electron Conducting Organic Coating of Mild Steel by Electropolymerization, *J. of Applied Biochem.*, 1992, vol. 22. pp. 756–764 (No Month).

S. Samhyanarayanan, et al., Soluble Conducting Poly Ethoxy Aniline as an Inhibitor for Iron in HCI, *Corrosion Science*, 1992, vol. 33, No. 12, pp. 1831–1841 (No Month).

Zhi Deng et al., Stabilization of Metal–Metal Oxide Surfaces Using Electroactive Polymer Films, *J. Electrochem. Soc.*, Aug. 1989, vol. 136, No. 8, pp. 2152–2158.

Zhi Deng et al., Application of Electroactive Films in Corrosion Protection, *J. Electrochem. Soc.*, Jul. 1991, vol. 138, No. 7, pp. 1911–1918.

F. Beck, A Novel Way to Corrosion Protection: The Electrochemical Deposition, *Metalloberflaeche*, 46(4), 177–82 (1992). Translation. (No Month).

*Primary Examiner*—John J. Zimmerman
*Assistant Examiner*—Michael LaVilla
*Attorney, Agent, or Firm*—Howell & Haferkamp, L.C.

[57] ABSTRACT

A metal/polymer laminate having a corrosion resistant metal surface. The laminate includes a metal film having opposite surfaces, one of which is coated with a coating which contains an intrinsically conducting polymer which inhibits corrosion of the opposite surface of the metal film. The coating can also be bonded to a substrate such as a non-conducting polymer or a second metal film. When the coating is also bonded to a substrate, it forms an interlayer between the metal film and the substrate. The laminate serves to protect the metal surface from corrosion in acid, salt and alkaline corrosive environments.

18 Claims, No Drawings

U.S. PATENT DOCUMENTS

| | | | |
|---|---|---|---|
| 5,183,842 | 2/1993 | O'Neil et al. | 524/288 |
| 5,188,766 | 2/1993 | Eiffler | 252/500 |
| 5,194,313 | 3/1993 | Hupe | 428/137 |
| 5,213,983 | 5/1993 | Gustafsson | 437/1 |
| 5,225,058 | 7/1993 | Bazzoni et al. | 204/196 |
| 5,232,631 | 8/1993 | Cao et al. | 252/500 |
| 5,233,000 | 8/1993 | Yodice | 526/258 |
| 5,264,157 | 11/1993 | Bidan et al. | 252/519 |
| 5,300,208 | 4/1994 | Angelopoulos | 205/50 |
| 5,415,893 | 5/1995 | Wiersma et al. | 427/385.5 |
| 5,427,841 | 6/1995 | De Leeuw | 428/209 |
| 5,441,772 | 8/1995 | McAndrew et al. | 427/388.1 |
| 5,532,025 | 7/1996 | Kinlen et al. | 427/388.1 |
| 5,563,424 | 10/1996 | Yang | 257/40 |

CORROSION INHIBITING MULTILAYER COATING

This application is the National Stage of International Application No. PCT/US94/08259, filed Jul. 22, 1994, which is a continuation-in-part of U.S. application Ser. No. 08/096,661, filed Jul. 23, 1993, now issued as U.S. Pat. No. 5,532,025.

This invention provides corrosion resistant metal laminates and methods of providing such laminates employing coatings of a mixture of inherently conducting polymer in a non-conducting matrix.

BACKGROUND OF THE INVENTION

Corrosion is a problem associated with virtually all metal objects that are exposed to an oxidizing environment. The effects of corrosion are particularly noticeable in automobiles, ships, aircraft, heavy machinery and bridges. Corrosion is a serious problem in the road construction industry, in various industrial processes and in medical devices. Metal corrosion is especially severe in harsh environmental conditions, e.g. exposure to acid, base or salts. Corrosion resistant coatings such as zinc, epoxy, tar, polymer and paint are typically applied as adhesive coatings on the exposed surfaces of a metal object providing a barrier to environmental attack. Although such coatings can comprise simply a polymeric composition, they commonly includes corrosion inhibiting heavy metal or toxic organic compounds to enhance corrosion resistance. Other diverse corrosion inhibiting compositions and materials are disclosed in U.S. Pat. Nos. 5,152,929, 4,818,777, 5,098,938, 5,021,489 and 5,183,842.

The application of a corrosion inhibiting coating onto a metal object is, however, not a complete solution to corrosion because most coatings are subject to cracks, chips, or scratches which expose the bare metal to the corrosive environment. Even the existence of pinhole discontinuities in a coating can be defeat the anticorrosion function of a coating. In this regard, the effects of corrosion at discrete locations as a result of a chip or a scratch can be particularly severe because the effects of the corrosive elements are concentrated at the point of exposure. Accordingly, conventional corrosion inhibiting compositions are not completely satisfactory in providing corrosion resistance to metal objects.

Intrinsically conducting polymers (ICP), organic polymers that have poly-conjugated π-electron systems, have been proposed as potential corrosion inhibiting compositions for metals. Such polymers have not heretofore been considered suitable as protective coatings because of the intractable nature of ICP's. That is, the class of ICP's lack the necessary properties, such as cohesion, adhesion, processability and stability, to be acceptable-for use as a protective coating on a metal object. Others have attempted to improve the properties of ICP's by modifying them or blending them with other polymers. For instance, U.S. Pat. No. 5,109,070 discloses sulfonated ICP; European Patent Application No. 0 497 514 discloses blends of ICP's and thermoplastic polymers; U.S. Pat. No. 5,160,457 discloses compositions of doped polyaniline and one or more thermoplastic, solution processable or thermoset polymers; and U.S. Pat. No. 4,983,690 discloses blends of polyaniline and a bismaleimide thermoset. Despite the widespread investigation of ICP's and ICP containing systems, viable corrosion protection systems employing ICP's remain an unfulfilled promise.

SUMMARY OF THE INVENTION

The present invention is, therefore, directed to novel corrosion inhibiting compositions, corrosion inhibited metal surfaces coated with the corrosion inhibiting compositions and methods for providing corrosion resistance to metal objects. In one significant aspect, the present invention provides a non-metal, conductive coating composition comprising a blend of ICP in a non-conducting polymer matrix which is adapted for use in corrosion-resistant metal laminates. Such laminates provided by this invention comprise, in series, a metal layer, a non-metal conductive layer and a non-conducting layer. In another aspect, a two component corrosion inhibiting coating for a metal surface comprises an electrically conductive intermediate coating of a blend of ICP and a non-conducting adhesive matrix and a non-conducting top coat.

Among the many advantages of the coating compositions of this invention is the capability of providing corrosion protection even in the presence of gaps in the coating that expose the underlying metal surface. A further advantage is that the coating compositions of this invention can provide corrosion inhibiting properties whether applied to an exposed or back side of a metal layer.

DETAILED DESCRIPTION OF THE PREFERRED EMBODIMENTS

It has been discovered that corrosion resistance can be provided to a metal surface or object exposed to a corrosive environment by applying, in series, a non-metal conductive layer and a non-conducting layer. The non-metal conductive layer comprises a blend of ICP in a non-conducting matrix, e.g. an inorganic matrix, a thermoset resin matrix or a thermoplastic polymer matrix, that is adherent to metal surfaces. The non-metal conductive layer is further characterized as having a surface resistance of less 1 gigaohm/square, e.g. not more than 1 megaohm/square, preferably less than 50 kilohms/square, even more preferably less than 1 kilohm/square, e.g. in the range of 10 to 500 ohms/square. The non-conducting layer can be a ceramic, thermoplastic polymer or a thermoset polymer. The non-conducting layer is essentially devoid of ICP but may contain trace amounts of ICP and have a surface resistivity at least 100 times the resistivity of the conductive layer, typically at least about 1 gigaohm/square.

Surprisingly, the corrosion inhibiting properties of such a two layer coating continues to be provided to the metal surface or object even when a portion of the coating has been removed from the metal surface such as by a scratch or pinhole to expose bare metal. Conventional protective coatings do not provide protection in areas where there is no coating or where the coating has been damaged to expose bare metal to the environment. The blend of ICP and non-conducting matrix is preferably formulated to be capable of direct application to a metal surface, by spray coating, brush application or the like. Thus, while ICP's have been suggested as a potential corrosion inhibiting composition because of their intrinsic electrical properties, a problem remained in the practical application of such compositions because of the intractable nature of the intrinsically conducting polymers and their inability to sufficiently adhere to a metal surface. A practical and useful composition employing an intrinsically conducting polymer blended with a binder material has now been discovered that overcomes such problems.

It has also been found, surprisingly, that coatings of this invention have the ability to provide corrosion resistance even in strongly alkaline environments although alkaline environments tend to deprotonate ICP's indicating a loss of corrosion inhibiting properties. This surprising discovery provides the coating industry with a corrosion inhibiting composition that can be used in almost any environment and eliminates the need for different coatings for different environmental applications. Moreover, it has been discovered that the coatings of this invention are capable of providing corrosion inhibiting properties even when applied to the back side of a thin metal layer film, e.g. about a 25 micrometers thick layer of metal deposited on a substrate of a mixture of ICP and a non-conducting matrix. Similarly, an ICP-containing layer can also be used as an interlayer between a pair of thin metal surfaces to provide corrosion protection thereto. Thus, the corrosion inhibiting compositions of the present invention need not necessarily be an exterior coating on the metal surface desired to be protected.

The coating compositions of this invention have utility in a wide variety of industries and applications including the automobile, aircraft and shipping industry as a corrosion inhibiting primers or surface coatings, the bridge and road construction industry as a coating for exposed steel on bridges or as a coating for reinforcing members such as rebar, the building construction industry as a coating for structural steel, chemical and industrial manufacturers as a coating for metallic machines, vessels, chambers and the like, and in medical applications as a protective coating for skin contact electrodes and the like. The compositions are also useful for various applications in the metallized textile industry.

It is believed that according to the invention, virtually any ICP can be used. As used herein, "ICP" means any inherently conducting polymer that is capable of conducting an electrical current therethrough in at least one valence state of the polymer. Generally, ICP's are organic polymers that have poly-conjugated $\pi$-electron systems. Examples of suitable ICP's for use in connection with the present invention include polyaniline, polypyrrole, polythiophene, poly (3-alkyl-thiophenes) such as poly (3-hexyl thiophene), poly (3-methyl thiophene) and poly-(3-octyl thiophene), polyisothianapthene, poly-(3-thienylmethylacetate), polydiacetylene, polyacetylene, polyguinoline, polyheteroarylenvinylene, in which the heteroarylene group can be thiophene, furan or pyrrole, poly-(3-thienylethylacetate), and the like, and derivatives, copolymers and mixtures thereof. Some ICP's exhibit the electrically conductive property naturally while others must be doped or charged to the proper valence state. ICP's typically exist in various valence states and are reversibly convertible into the various states by electrochemical reactions. For example, polyaniline can exist in numerous valence states such as a reduced state (leucoemeraldine), a partially oxidized state (emeraldine) and a fully oxidized state (pernigraniline). Polyaniline is most conductive in its emeraldine form (+2 electrons). This partially oxidized state of polyaniline can be formed by doping polyaniline with a suitable material to increase the electrical conductivity of the polymer. Useful dopants for polyaniline include tetracyanoethylene (TCNE), zinc nitrate, p-toluenesulfonic acid (PTSA) or any suitable mineral or organic acid. Preferred dopants include naphthalene sulfonic acids such as dinonyl napthalene sulfonic acid and dinonyl naphthalene disulfonic acid. It should be understood that the ICP selected for use in connection with the present invention can be provided in either a doped or an undoped form before it is blended with a matrix material or before it is applied to a metal surface or object. If applied in an undoped state, the a nonconducting polymer can be doped or similarly treated to establish the necessary and appropriate electrical conductivity of the ICP so that it is capable of imparting its corrosion resistance properties to the metal surface or object. In preferred embodiments, the ICP is doped polyaniline, polypyrrole or poly(3-methyl thiophene). The most preferred ICP is a sulfonic acid doped polyaniline.

To impart suitable metal adhesion to the non-metal conducting layer in the laminates of this invention, it has been discovered that ICP's can be blended with a non-conducting matrix without adversely affecting the corrosion inhibiting properties of the ICP. As previously described, most ICP's, and polyaniline in particular, do not have acceptable metal adhesion to permit them to be used directly as a coating on a metal surface. Neat ICP's tend to quickly and easily delaminate from a metal surface to which they have been applied. The non-conducting matrix is selected for its capability of direct application to a metal surface or object and sufficient adhesion to a metal substrate such that it is not removed in a standard adhesion test such as ASTM Standard Method D3359. This adhesion test generally involves scribing an "X" or a series of cross-hatches in the layer of coating to expose the bare metal, applying adhesive tape to the scribed portion, removing the adhesive tape and observing if any of the coating layer is removed and comparing the amount of coating that is removed to a standard classification table for the adhesion test as designated in ASTM D3359, or other adhesion test accepted by the coatings industry. Any binder material capable of providing the necessary adhesion properties to the blend and capable of being blended with the ICP can be used in connection with the present invention.

The non-conducting matrix may be any material which converts to a solid, cohesive layer that adheres to a metal surface and provides a matrix in which the ICP is dissolved or dispersed in a dispersed or continuous phase. The matrix may comprise inorganic material such as a silicate, a zirconate, or a titanate. The matrix may also comprise an organic polymer such as a thermoplastic or thermoset polymer resin. Exemplary thermoplastic resins include vinyl polymers such as polystyrene, polybutylacrylate, polyvinyl chloride acrylate and the like, polyolefins such as polyethylene and polypropylene, polycarbonate, polyester such as polyethylene terephthalate, polyamide such as nylon-6 or nylon-6,6, graft copolymer such as ABS, and thermoplastic elastomers including dynamically vulcanized blends of polypropylene and EPDM-rubber. For many corrosion resistance applications the matrix is preferably a thermoset organic resins such as shellac, tung oil, phenolic resins, alkyd resins, aminoplast resins, vinyl alkyds, epoxy alkyds, silicone alkyds, uralkyds, epoxy resins, coal tar epoxies, urethane resins, polyurethanes, unsaturated polyester resins, silicones, vinyl acetates, vinyl acrylics, acrylic resins, phenolics, epoxy phenolics, vinyl resins, polyimides, unsaturated olefin resins, fluorinated olefin resins, crosslinkable styrenic resins, crosslinkable polyamide resins, rubber precursor, elastomer precursor, ionomers, mixtures and derivatives thereof, and mixtures thereof with crosslinking agents. In preferred embodiments of this invention, the matrix material is crosslinkable polymer such as an epoxy resin, a polyimide, a polyurethane, an unsaturated polyester, a silicone, a phenolic resin or an epoxy phenolic resin. Exemplary cross-linkable resins include aliphatic amine-cured epoxies, polyamide epoxy, polyamine adducts with epoxy, ketimine epoxy coatings, aromatic amine-cured epoxies, silicone modified epoxy resins, epoxy phenolic coatings, epoxy urethane coatings, coal tar epoxies, oil-modified polyurethanes, moisture cured polyurethanes, blocked urethanes, two component polyurethanes, aliphatic isocyanate curing polyurethanes, polyvinyl acetals and the like, ionomers, fluorinated olefin resins, mixtures of such resins, aqueous basic or acidic dispersions of such resins, or aqueous emulsions of such resins, and the like. Other suitable non-conducting matrix materials are described in "Corrosion Prevention by Protective Coatings" by Charles G. Munger (National Association of Corrosion Engineers 1984). The matrix material can be aqueous based or solvent based and can include other corrosion inhibiting compositions such as those disclosed in U.S. Pat. Nos. 5,152,929, 4,818,777, 5,098,938 and 5,183,842.

The matrix material can be prepared and subsequently blended with the ICP or it can be combined with ICP and treated or reacted as necessary. When a crosslinkable matrix material is used, ICP can be added prior to or concurrently with the crosslinking step. In this manner it is possible to create a coating composition where the ICP is cross-linked with the crosslinkable matrix.

Crosslinkable matrix materials particularly suitable for this application include two component crosslinkable polyurethane and epoxy systems as well as polyvinylbutyral systems that are cross-linked by the addition of phosphoric acid in butanol. Typical polyurethane coatings are made by reacting an isocyanate with hydroxyl-containing compounds such as water, mono- and diglycerides made by the alcoholysis of drying oils, polyesters, polyethers, epoxy resins and the like. Typical epoxy coatings are prepared by the reaction of an amine with an epoxide, e.g., the reaction of bisphenol A with epichlorohydrin to produce an epoxide that is then reacted with the amine. A useful blending method involves polymerizing polyaniline in a non-conducting matrix polymer solution, e.g. polyvinylbutyral in ethanol, followed by reacting the polyvinylbutyral/polyaniline mixture with phosphoric acid in butanol. When epoxies or polyurethanes are used as the non-conducting matrix polymer, a blend of polyaniline and the matrix polymer can be formulated so that the cross-linking catalyst is added just prior to the coating application. In an alternate embodiment, the ICP can be added and blended with the cross-linking agent.

The metal surface or object to be coated with the corrosion inhibiting composition of this invention can be virtually any metal that is susceptible to corrosion. Thus, virtually all metals and metal alloys can be used in conjunction with the present invention including silver, aluminum, iron, nickel, copper, zinc, cobalt, lead, iron based alloys such as steel, tantalum, titanium, zirconium, niobium, chromium, and the like, and alloys thereof. As will be discussed in more detail hereinafter, the metal surface or object may be provided in virtually any shape or form and includes thin films of metal that have been deposited by sputter deposition or similar methods on a non-metallic substrate.

In the preparation of a blend of an ICP and a non-conducting matrix material, the components are blended in a ratio that maintains the matrix material's properties, e.g. metal surface adhesion, while maintaining the electrical conductivity of the ICP so that the blend is capable of providing corrosion resistant properties. The amount of ICP in the blend can be in the range of 0.1 to 80 percent, by volume. Preferably, the blend comprises between about 1 and 50 percent, by volume. It should be understood that particular applications may require particular ratios of the ICP and the matrix material in the resulting blend. The optimal relative proportions of the components of the blend depend on the particular components being utilized, the substrate to be coated and the specific technique employed for applying the coating to the substrate. It should also be understood that the ICP can be provided "neat" or as a dispersion in an appropriate solvent, typically an organic solvent. In particular, polyaniline can be dissolved in most organic solvents such as 1-methyl-2-pyrrolidinone (NMP). The term "blend" as used herein is meant to include blends of an ICP and a matrix material where there is no chemical reaction between the two components as well as combinations which involve a chemical reaction between the ICP and the matrix material. In this regard, "blends" of ICP's and matrix materials include combinations forming interpenetrating networks of ICP and a matrix material, as well as emulsions and dispersions of the two components. Furthermore, the ICP can be provided in a doped state or an undoped state and subsequently doped to the desired electrically conductive state.

In one embodiment of the present invention, a two component corrosion inhibiting coating for a metal surface is provided wherein a metal object or surface is coated with a first layer comprising a blend of an ICP and a non-conducting matrix as hereinabove described. The blend is applied by brushing or spraying onto the metal surface or object to provide a thin layer of the blend coating the metal surface or object. Preferably, the coating is between about 2 and 120 micrometers in thickness, more preferably between about 25 and 50 micrometers. A non-conducting topcoat provides physical protection to the ICP-containing layer. The topcoat may be the same as, or different from, the matrix of the ICP-containing layer, e.g. an inorganic coating such as a silicate, a thermoplastic such as polyethylene or a thermoset such as an epoxy resin. In many applications, the topcoat comprises a conventional corrosion inhibiting barrier material such as an epoxy, an acrylic or a lacquer. In many cases the topcoat also comprises a finish coat containing a pigment to impart desirable aesthetic features to the object.

ICP's and blends thereof with matrix materials also find utility as a corrosion inhibitor as an underlayer to an exposed metal surface even when applied to the non-exposed surface of a metal. This is particularly true with respect to thin films of metal that are deposited onto a non-metallic substrate. In this regard, the present method is applicable to any conventional substrate including three-dimensional objects, plates, textiles and fibers. More particularly, non-metallic substrates such fibers or films of nylon, polyester or polyaramid are suitable for use in this invention. The ICP-containing matrix can be applied to a non-conducting substrate as part of the catalyst/carrier polymer film that is applied prior to the electroless deposition of a layer of metal such as copper, nickel or cobalt. Electroless deposition methods such as those described in U.S. Pat. Nos. 4,910,072 and 5,082,734 can be adapted to using the ICP-containing blends of this invention as a carrier polymer for a catalytic (typically, palladium) compound. Although the non-exposed surface of such a thin metal film is in intimate contact with the ICP-containing matrix, the opposing exposed metal surface exhibits enhanced resistance to corrosion.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples that follow, all percentages are given on a volume basis unless otherwise indicated.

EXAMPLE 1

The following example illustrates the corrosion protection provided by the two component coating composition of the present invention in an acidic environment.

C1018 steel coupons were sand blasted, degreased in a chloroform ultrasonic bath, and brush coated with a dispersion of polyaniline and poly(butylmethacrylate) in butyrolactone (Dispersion 34820-W5 from Americhem Inc.). The coated coupons were allowed to air dry for three hours followed by heating at 60° C. for one hour in an air convection oven. An epoxy topcoat (Carboline 890 from the Carboline Co.) was then applied according to the manufacturer's instructions. This coating was air dried at room temperature then exposed to 60° C. air for 12 hours. The coupons were touched up with additional epoxy and dried for an additional 24 hours at 60° C. to provide coupons of laminates of this invention comprising steel with an intermediate coating of a blend of epoxy and polyaniline and an epoxy top coat. Control coupons were (a) uncoated, (b) coated with epoxy alone or (c) coated with the polyaniline dispersion alone. A 1 cm×1 cm cross was then scribe through the coatings to expose bare metal to simulate a scratch.

The steel/polyaniline-epoxy/epoxy laminate coupons of this invention and control coupons were immersed for two weeks in an aerated acid bath, i.e. an aqueous solution of 0.1M hydrochloric acid at pH 1.06 and 35° C. At the end of the two week period, the steel/polyaniline-epoxy/epoxy laminate coupons exhibited no corrosion or coating disbandment. The control coupons, on the other hand, exhibited various stages of corrosion. The coupon coated only with the epoxy coating exhibited delamination of the coating with underlying general corrosion. The coupon coated only with the polyaniline dispersion exhibited blistering of the coating and corrosion beneath the blister as well as other areas of corrosion and non-uniform protection. The uncoated coupon exhibited massive general corrosion throughout the coupon.

EXAMPLE 2

This example illustrates the corrosion inhibiting properties of the two component coating composition of this invention in high salt environments.

C1018 steel coupons were prepared as in Example 1 and were immersed for two weeks in an aerated salt bath, i.e. an aqueous solution of 3.5 weight percent sodium chloride at pH 5.33 and 35° C. The steel/polyaniline-epoxy/epoxy laminate coupon exhibited some minor corrosion and delamination at the site of the scratch, but was overall protected from corrosion. The epoxy coated coupons exhibited a blistered coating and corrosion at the site of the scratch with coating delamination at the scratch. The polyaniline coated coupon exhibited blistering of the coating with corrosion beneath the blister. The uncoated coupon exhibited massive general corrosion.

EXAMPLE 3

This example illustrates the corrosion inhibiting properties of the two component coating of the present invention in a strongly alkaline environment.

C1018 steel coupons were prepared as described in Example 1 and immersed for two weeks in caustic salt bath, i.e. an aqueous solution of 3.5 weight percent sodium chloride and 0.1 weight percent sodium hydroxide at pH 12.38 and 35° C. The steel/polyaniline-epoxy/epoxy laminate coupon exhibited no corrosion or corrosive attack. The epoxy coated coupon exhibited blistering with corrosion under the blisters and coating delamination along the scratch as well as pitting near the scratch. The polyaniline coated coupon exhibited blistering of the coating with corrosion beneath the blister. The uncoated coupon exhibited a large pit caused by local corrosion in addition to other local corrosion.

EXAMPLE 4

This example illustrates the application of an ICP-containing layer as an underlayer to a thin metal film to provide corrosion inhibiting properties thereto.

A sheet of sulfonated perfluorinated polymer (Nafion 117) was hydrated by boiling for 30 minutes in distilled water. Strips cut from the sheet were soaked in a 10 weight percent aqueous ferric chloride solution. The hydrated polymer strips were rinsed with distilled water and allowed to air dry. Several of these hydrated polymer strips were placed in a glass developing jar containing pyrrole. The ferric-containing polymer strips turned from yellow to blue to black, indicating the formation of polypyrrole. The polypyrrole-containing strips were then rinsed with distilled water and air dried at room temperature. A number of the polypyrrole-containing strips and hydrated strips were then soaked for a few minutes in a solution of palladium acetate (0.6 grams in 10 ml acetone and 2 ml water) to incorporate the palladium ions into the polymer by ion exchange. A conventional copper electroless deposition bath was then used to electrolessly plate copper onto the sheets.

Sample A was a sulfonated perfluorinated polymer strip containing with polypyrrole and palladium and a surface layer of electrolessly deposited copper; bright copper rapidly deposited onto Sample A.

Sample B was a hydrated sulfonated perfluorinated polymer strip with palladium and no polyprrole; non-uniform copper rapidly deposited onto Sample B.

Both samples were exposed to ambient air for 24 hours. Sample A maintained its brightness, but Sample B became dull in appearance. This illustrates the ability of the ICP-containing coating to function as a corrosion inhibiting composition even when applied as a back side layer on a metal film.

EXAMPLE 5

This example illustrates the use of ICP blended with a matrix material as a corrosion inhibiting coating on an automobile.

In November of 1992, a blend of p-toluenesulfonic acid doped polyaniline in Carboline 890 epoxy was applied to the exterior surface of a portion of a pick-up truck where the paint had been removed exposing bare metal. The blend was allowed to dry briefly and a portion of the blend coating was then overcoated with an epoxy topcoat (Carboline 890). A scratch was scribe into the coating after it had been allowed to dry. The truck has been used regularly since the date of the application in a wide range of temperatures and environmental conditions and after 18 months no corrosion has been initiated in this portion of the truck.

EXAMPLE 6

This example illustrates the compatibility of a doped polyaniline with various binder materials.

4 g of CarboZinc 11 Base (an inorganic silicate base manufactured by Carboline) was mixed with 1 g of Versicon p-toluenesulfonic acid-doped polyaniline (Allied Signal Co.) About 2 g of solvent was added to provide a viscosity suitable for dip coating. Two carbon steel coupons and two glass microscope slide were dip coated and air dried at ambient temperature and were then air dried overnight in an air convection oven. The resistance of the coating on the microscope slide was measured and determined to be 4 kilohms/square (K$\Omega$/□).

5 g of a polyvinylbutyral/g-butyrolactone solution was mixed with 8.6 g of Americhem W5 polyaniline solution and diluted with about 7 g of g-butyrolactone. A film was cast on a microscope slide using a stirring rod and, after drying overnight, the resistance of the coating on the slide was about 90 K$\Omega$/□. A polyaniline film alone yielded a resistance of about 20 K$\Omega$/□.

40 mg of p-toluenesulfonic acid-doped polyaniline was dispersed into 2.8 g of liquid polyurethane (Minwax Company, Inc. Montvale, N.J.). The dispersed polyaniline remained green, indicating that it remained protonated even in the presence of the polyurethane material. The dispersion was coated onto a microscope slide and a steel coupon and allowed to dry overnight. A clear polyurethane coating formed over the steel coupon.

13 g of Americhem W5 polyaniline was blended with 5 g of G. E. Silicone 994 Varnish. The blended polyaniline remained in its protonated state as evidenced by its green color. A film of the blend coated onto a glass microscope slide had a measured resistance of 40 K$\Omega$/□. After overnight drying, a flexible film developed with little or no adhesion to the glass slide. The same solution was coated onto a steel coupon and a smooth green coating was obtained after air drying that adhered to the steel.

In view of the above, it will be seen that the several advantages of the invention are achieved and other advantageous results attained. As various changes could be made in the above methods and compositions without departing from the scope of the invention, it is intended that all matter contained in the above description shall be interpreted as illustrative and not in a limiting sense.

What is claimed is:

1. A metal/polymer laminate having a corrosion resistant metal surface, the laminate comprising a metal film having a thickness of about 25 micrometers or less, the film having a coated surface and an opposite surface from the coated surface, the coated surface being coated with a coating comprising an intrinsically conducting polymer in a non-conducting matrix, which coating inhibits corrosion of the opposite surface of the metal film.

2. A metal/polymer laminate as set forth in claim 1, wherein said intrinsically conducting polymer is selected from the group consisting of polyanilines, polypyrroles and polythiophenes.

3. A metal/polymer laminate as set forth in claim 2, wherein said intrinsically conducting polymer comprises polypyrrole.

4. A metal/polymer laminate as set forth in claim 1, wherein said metal film is electrolessly deposited on said coating.

5. A metal/polymer laminate as set forth in claim 1, wherein said coating comprises palladium.

6. A metal/polymer laminate as set forth in claim 4, wherein said metal comprises copper.

7. A metal/polymer laminate as set forth in claim 1, wherein the laminate overlays a substrate such that the coating is an interlayer between the substrate and the metal film.

8. A metal/polymer laminate as set forth in claim 7, wherein said substrate comprises a non-conducting polymeric material.

9. A metal/polymer laminate as set forth in claim 8, wherein said substrate is a film, fiber, textile, or plate.

10. A metal/polymer laminate as set forth in claim 9, wherein said substrate is a three-dimensional object.

11. A metal/polymer laminate as set forth in claim 7, wherein said substrate comprises a second metal film.

12. A method for inhibiting corrosion on an exposed surface of a metal film also having an opposite surface from the exposed surface, said method comprising adhering the opposite surface of a metal film of about 25 micrometers or less in thickness to a blend of an intrinsically conducting polymer and a non-conducting matrix material.

13. A method as set forth in claim 12, wherein the intrinsically conducting polymer is selected from polyaniline, polypyrrole or polythiophene.

14. A method as set forth in claim 13, wherein the blend of an intrinsically conducting polymer and a non-conducting matrix material comprises polyaniline in a polymer matrix.

15. A method as set forth in claim 12, wherein said metal is steel.

16. A method as set forth in claim 12, wherein said metal film is copper which is adhered to the mixture by electroless deposition.

17. A method as set forth in claim 12, wherein the exposed surface is exposed to an alkaline environment.

18. A method as set forth in claim 12, wherein the exposed surface is exposed to a salt environment.

* * * * *